(12) United States Patent
Hewitt et al.

(10) Patent No.: US 8,713,112 B2
(45) Date of Patent: Apr. 29, 2014

(54) MANAGING AND COLLABORATING WITH DIGITAL CONTENT

(75) Inventors: Joe Hewitt, Los Gatos, CA (US); Marlon Bishop, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 495 days.

(21) Appl. No.: 12/728,845

(22) Filed: Mar. 22, 2010

(65) Prior Publication Data

US 2010/0174799 A1 Jul. 8, 2010

Related U.S. Application Data

(63) Continuation of application No. 11/170,859, filed on Jun. 30, 2005, now Pat. No. 7,689,655, which is a continuation-in-part of application No. 11/005,348, filed on Dec. 6, 2004, now abandoned.

(51) Int. Cl.
*G06F 15/16* (2006.01)

(52) U.S. Cl.
USPC .......................................... 709/206; 709/204

(58) Field of Classification Search
USPC ......................................................... 709/206
See application file for complete search history.

(56) References Cited

U.S. PATENT DOCUMENTS

| | | | |
|---|---|---|---|
| 5,418,908 A * | 5/1995 | Keller et al. ................... | 709/206 |
| 5,557,723 A | 9/1996 | Holt et al. | |
| 5,796,404 A | 8/1998 | Gentner | |
| 5,884,309 A | 3/1999 | Vanechanos, Jr. | |
| 6,085,201 A | 7/2000 | Tso | |
| 6,105,055 A | 8/2000 | Pizano et al. | |
| 6,151,507 A | 11/2000 | Laiho et al. | |
| 6,259,449 B1 | 7/2001 | Saxena et al. | |
| 6,301,609 B1 | 10/2001 | Aravamudan et al. | |
| 6,430,604 B1 | 8/2002 | Ogle et al. | |
| 6,557,027 B1 | 4/2003 | Cragun | |
| 6,563,913 B1 | 5/2003 | Kaghazian | |
| 6,687,741 B1 * | 2/2004 | Ramaley et al. .............. | 709/206 |
| 6,697,840 B1 | 2/2004 | Godefroid et al. | |
| 6,718,368 B1 | 4/2004 | Ayyadurai | |
| 6,748,402 B1 | 6/2004 | Reeves et al. | |
| 6,807,565 B1 | 10/2004 | Dodrill et al. | |
| 6,845,370 B2 | 1/2005 | Burkey et al. | |
| 6,859,909 B1 * | 2/2005 | Lerner et al. .................. | 715/203 |
| 6,869,018 B2 * | 3/2005 | Fifield et al. .................. | 235/487 |
| 6,917,965 B2 | 7/2005 | Gupta et al. | |
| 6,944,821 B1 * | 9/2005 | Bates et al. ................... | 715/209 |
| 6,981,223 B2 | 12/2005 | Becker et al. | |
| 7,035,903 B1 | 4/2006 | Baldonado | |

(Continued)

OTHER PUBLICATIONS

Padwick et al., Special Edition Using Microsoft Outlook 2000, May 12, 1999, 20 pages, Que.

(Continued)

*Primary Examiner* — Michael Chao
(74) *Attorney, Agent, or Firm* — Keller Jolley Preece (57) ABSTRACT

A universal digital content system provides a dynamic user interface having a viewing area, an action menu area, and an organizing area. A user can create, organize, send, receive, access, collaborate with and otherwise manage digital content through a single user interface. The universal digital content system provides multiple ways of viewing and organizing all of the digital content accessible through the dynamic user interface. In addition, a user can create a collaboration session with one or more contacts using one or more digital content files.

14 Claims, 6 Drawing Sheets

(56) References Cited

U.S. PATENT DOCUMENTS

| | | | |
|---|---|---|---|
| 7,130,885 B2 * | 10/2006 | Chandra et al. | 709/206 |
| 7,171,190 B2 | 1/2007 | Ye et al. | |
| 7,194,516 B2 * | 3/2007 | Giacobbe et al. | 709/206 |
| 7,243,299 B1 * | 7/2007 | Rubin et al. | 715/209 |
| 7,248,684 B2 | 7/2007 | Caspi et al. | |
| 7,272,634 B2 | 9/2007 | Clement et al. | |
| 7,356,772 B2 | 4/2008 | Brownholtz et al. | |
| 7,412,491 B2 | 8/2008 | Gusler et al. | |
| 7,421,660 B2 | 9/2008 | Charnock et al. | |
| 7,424,516 B2 | 9/2008 | Leeds | |
| 7,461,378 B2 | 12/2008 | Beyda | |
| 7,689,655 B2 | 3/2010 | Hewitt et al. | |
| 2002/0035605 A1 | 3/2002 | McDowell et al. | |
| 2002/0065894 A1 | 5/2002 | Dalal et al. | |
| 2002/0078150 A1 | 6/2002 | Thompson et al. | |
| 2002/0126701 A1 | 9/2002 | Requena | |
| 2002/0130904 A1 * | 9/2002 | Becker et al. | 345/753 |
| 2002/0174185 A1 | 11/2002 | Rawar et al. | |
| 2003/0009511 A1 | 1/2003 | Giotta et al. | |
| 2003/0017848 A1 | 1/2003 | Engstrom et al. | |
| 2003/0023691 A1 | 1/2003 | Knauerhase | |
| 2003/0028597 A1 | 2/2003 | Salmi et al. | |
| 2003/0041141 A1 | 2/2003 | Abdel-Aziz et al. | |
| 2003/0046396 A1 | 3/2003 | Richter et al. | |
| 2003/0065788 A1 | 4/2003 | Salomaki | |
| 2003/0131142 A1 | 7/2003 | Horvitz et al. | |
| 2003/0154293 A1 | 8/2003 | Zmolek | |
| 2003/0158902 A1 | 8/2003 | Volach | |
| 2003/0200272 A1 | 10/2003 | Campise et al. | |
| 2004/0003042 A1 | 1/2004 | Horvitz et al. | |
| 2004/0028208 A1 | 2/2004 | Carnazza et al. | |
| 2004/0030750 A1 | 2/2004 | Moore et al. | |
| 2004/0044674 A1 | 3/2004 | Mohammadioun et al. | |
| 2004/0044736 A1 | 3/2004 | Austin-Lane et al. | |
| 2004/0054735 A1 | 3/2004 | Daniell et al. | |
| 2004/0059781 A1 | 3/2004 | Yoakum et al. | |
| 2004/0064511 A1 | 4/2004 | Abdel-Aziz et al. | |
| 2004/0071150 A1 | 4/2004 | Honkala et al. | |
| 2004/0098484 A1 | 5/2004 | Wuebker et al. | |
| 2004/0098515 A1 | 5/2004 | Rezvani et al. | |
| 2004/0128356 A1 * | 7/2004 | Bernstein et al. | 709/206 |
| 2004/0137884 A1 | 7/2004 | Engstrom et al. | |
| 2004/0137955 A1 | 7/2004 | Engstrom et al. | |
| 2004/0186896 A1 | 9/2004 | Daniell et al. | |
| 2005/0009541 A1 | 1/2005 | Ye et al. | |
| 2005/0076110 A1 | 4/2005 | Mathew et al. | |
| 2005/0091603 A1 | 4/2005 | Chen et al. | |
| 2005/0114533 A1 | 5/2005 | Hullfish et al. | |
| 2005/0149622 A1 | 7/2005 | Kirkland et al. | |
| 2005/0198183 A1 | 9/2005 | Zilliacus et al. | |
| 2005/0210112 A1 | 9/2005 | Clement et al. | |
| 2006/0009243 A1 | 1/2006 | Dahan et al. | |
| 2006/0036692 A1 * | 2/2006 | Morinigo et al. | 709/206 |
| 2006/0053379 A1 | 3/2006 | Henderson et al. | |
| 2006/0088144 A1 | 4/2006 | Mitchell et al. | |
| 2006/0123346 A1 | 6/2006 | Totman et al. | |
| 2006/0143157 A1 | 6/2006 | Landsman | |
| 2007/0112915 A1 | 5/2007 | Klassen et al. | |
| 2007/0150496 A1 * | 6/2007 | Feinsmith | 707/100 |
| 2013/0067355 A1 | 3/2013 | Hewitt et al. | |

OTHER PUBLICATIONS

Miao et al., Seamless Messaging in a Multimedia Network Environment, Signal Processing, 2002 6th International Conference, vol. 2, Aug. 26-30, 2002, pp. 1031-1034. Retrieved online from IEEE May 19, 2009.

"Unified-View Objective Converged Communications Information", Art Rosenberg, retrieved on Nov. 28, 2005, 2 pgs., Retrieved from the Internet: http://web.archive.org/web/20051128031928/http://www.unified-view.com/home.html.

"About Buddy Alert", Mike Singer, retrieved on May 22, 2007, 1 pg.,Retrieved from the Internet: http://www.aol.in/help/aimhelp.jhtml.

Emacs, GNU Emacs Maunal—Version 19 Antenews [online], Jan. 13, 2003. [retrieved on Jul. 31, 2008]. 2 pages. Retrieved from the Internet: http://web.archive.org/web/20030113095437:http://www.cs.utah.edu/dept/old/texinfo/emacs18/emacs_34.html.

U.S. Appl. No. 11/078,641, Dec. 31, 2007, Final Office Action.
U.S. Appl. No. 11/005,348, Sep. 17, 2008, Final Office Action.
U.S. Appl. No. 11/078,641, Jan. 5, 2009, Office Action.
U.S. Appl. No. 11/078,641, Apr. 29, 2009, Final Office Action.
U.S. Appl. No. 11/078,641, May 14, 2009, Final Office Action.

Emacs, GNU Emacs Manual—Version 19 Antenews [online], Jan. 13, 2003, [Retrieved on Jul. 31, 2008]. Retrieved from the Internet: <URL: http://web.archive.org/web/20030113095437/http://www/cs.utah.edu/dept/old/texinfo/emacs18/emacs_34.html>, pp. 1-2.

Zhenjiang et al., Seamless Messaging in a Multimedia Network Environment, Signal Processing, 2002 6th International Conference, vol. 2, Aug. 26-30, 2002, pp. 1031-1034. Retrieved online from IEEE May 19, 2009.

Padwick et al., Special Editiion Using Microsoft Outlook 2000, May 12, 1999, 21 pages, Que.

Rosenberg, "Unified-View Objective Converged Communications Information", retrieved on Nov. 28, 2005, 2 pgs., Retrieved from the Internet: http://web.archive.org/web/20051128031928/http://www.unified-view.com/home.jhtml.

Singer, "About Buddy Alert", retrieved on May 22, 2007, 1 pg., Retrieved from the Internet: http://www.aol.in/help/aimhelp.jhtml.

U.S. Appl. No. 11/005,348, Apr. 15, 2008, Office Action.
U.S. Appl. No. 11/005,348, Sep. 17, 2008, Office Action.
U.S. Appl. No. 11/078,641, Jul. 25, 2007, Office Action.
U.S. Appl. No. 11/078,641, Dec. 31, 2007, Office Action.
U.S. Appl. No. 11/078,641, Aug. 5, 2008, Office Action.
U.S. Appl. No. 11/078,641, Apr. 29, 2009, Office Action.
U.S. Appl. No. 11/170,859, Aug. 6, 2008, Office Action.
U.S. Appl. No. 11/170,859, Jan. 26, 2009, Office Action.
U.S. Appl. No. 11/170,859, Jul. 20, 2009, Office Action.
U.S. Appl. No. 11/170,859, Nov. 16, 2009, Notice of Allowance.
U.S. Appl. No. 11/421,664, Jan. 5, 2009, Office Action.
U.S. Appl. No. 11/421,664, May 14, 2009, Office Action.
U.S. Appl. No. 13/620,932, Jul. 16, 2013, Office Action.

* cited by examiner

| Global Inbox | Contacts | Organizing Information | Document Files | Message Folders | Image Files | Audio Files | Video Files |
|---|---|---|---|---|---|---|---|
| — Instant Messages | | | | | | | |
| — Today | | | | | | | |
| | Author | Subject | Date | Attach | Conversation | Other Contacts | |
| | Jim Anderson | Re: Royalties | 5/30/05 5:22PM-5:40PM | Y | 1 | Tracy Bender Susan Chen Peter Gallegos | |
| | Peter Gallegos | Re: Royalties | 5/30/05 3:05PM-3:16PM | Y | 1 | Jim Anderson Tracy Bender Susan Chen | |
| + Last Week | | | | | | | |
| + Last Month | | | | | | | |
| + Last Year | | | | | | | |
| — Email Messages | | | | | | | |
| — Last Week | | | | | | | |
| | Author | Subject | Date | Attach | Conversation | Other Contacts | |
| | Susan Chen | Re: Royalties | 5/26/05 | Y | 1 | Jim Anderson Tracy Bender Peter Gallegos | |
| | Tracy Bender | Royalties | 5/25/05 | N | 1 | Jim Anderson Susan Chen Peter Gallegos | |
| | Jim Anderson | Picture of Dog | 5/22/05 | Y | 2 | | |
| + Voice Messages | | | | | | | |
| + Text Messages | | | | | | | |
| — Documents | | | | | | | |
| — Today | | | | | | | |
| | Author | Subject | Date | Attach | Conversation | Other Contacts | |
| | Jim Anderson | Re: Royalties | 5/30/05 5:22PM-5:40PM | As Attach | 1 | Tracy Bender Susan Chen Peter Gallegos | |
| — Image Files | | | | | | | |
| — Last Week | | | | | | | |
| | Author | Subject | Date | Attach | Conversation | Other Contacts | |
| | Jim Anderson | Picture of Dog | 5/22/05 | As Attach | 2 | | |
| + Audio Files | | | | | | | |
| + Movie Files | | | | | | | |

MANAGING AND COLLABORATING WITH DIGITAL CONTENT

CROSS-REFERENCE TO RELATED APPLICATIONS

This application is a continuation of U.S. patent application Ser. No. 11/170,859, filed Jun. 30, 2005 and entitled MANAGING AND COLLABORATING WITH DIGITAL CONTENT USING A DYNAMIC USER INTERFACE; which is a continuation-in-part of U.S. patent application Ser. No. 11/005,348, filed Dec. 6, 2004 and entitled SELECTION OF DELIVERY MECHANISM FOR TEXT-BASED DOCUMENT. All of these applications are incorporated herein by reference in their entireties.

BACKGROUND OF THE INVENTION

1. The Field of the Invention

The present invention relates to systems and methods for organizing digital content and collaborating with digital content using a universal digital content system having a dynamic user interface.

2. The Relevant Technology

The electronic age has revolutionized the way in which people communicate. In many cases, paper and other visual media have been replaced by digital content, such as electronic text documents such as word processing documents, electronic notes, electronic journals entries, electronic messages, instant messages, text messages, and the like, or other multimedia content such as digital photos, audio files, and video files. However, people continue to use digital content in much the same way that conventional visual media are used—to send messages to other people, to maintain lists for organizational purposes, to keep journals, to maintain electronic photo albums, to view television and/or movie clips, and the like.

Various software applications have been developed to enable people to continue to use digital content for these various purposes. For example, electronic messaging software has become a primary means for people to send text-based electronic messages to each other. Instant messaging and text messaging have developed as alternative ways to send text-based electronic messages. Various organizational information software applications have been developed to assist people in organizing personal contact, calendar, journal, and task information. Other applications have developed for other multi-media digital content such as digital photo software, multi-media players, and the like.

However, having to switch between multiple applications that are specifically designed for one or only a few types of digital content, is time consuming for a user. Furthermore, it can be difficult for a user to remember where a certain file is saved. Or, if a file was delivered to the user, the user may have a hard time remembering who sent the file or where it is located. Further, where users may communicate by multiple messaging systems, e.g., by electronic messaging and instant messaging, viewing past emails or instant messages may not provide a complete representation of the overall conversation in which the multiple messages took place. Thus, the user must consult stored files in both applications to reconstruct the pieces and the chronology of the conversation. In some cases, some instant messaging applications do not store a conversation at all. Rather than go through the trouble of reconstructing conversations, a user will usually rely on her memory.

BRIEF SUMMARY OF THE INVENTION

These and other limitations are overcome by embodiments of the present invention, which relate to systems and methods for organizing and collaborating with digital content using a universal digital content system having a dynamic user interface. One embodiment of the present invention allows a user to generate a digital content file and select an action for the digital content file without having to commit beforehand to the type of action. The dynamic user interface is initially generic, but then can morph and adapt depending on the type of digital content file being created and/or the action selected. The network status of potential recipients of the digital content file may be monitored in order to assist a user in selecting a particular action for the digital content file. Thus, a user can seamlessly switch from one application to another through the same dynamic user interface.

In another embodiment, the user can access messages through the dynamic user interface. Conventionally, users had to receive different types of electronic messages using specific applications for that type of message. The universal digital content system simplifies the process of receiving messages by providing a single user interface through which a user can access messages. The dynamic user interface will morph depending on the type of electronic message being accessed. Further, because the user could be inundated with numerous messages at sometimes inconvenient times, a user can specify the method of delivery of messages (e.g., send instant messages as emails) and times at which certain delivery methods will be available. In addition, a user could allow incoming messages from certain people to be passed through to the dynamic user interface while notifications of messages from other people are withheld until the user accesses a messaging application through the dynamic user interface.

Another embodiment of the invention relates to the organization of digital content that is created or otherwise accessed by the user via the universal digital content system. When digital content is created or received through the universal digital content system, it is stored and organized in a storage device so that it is searchable by many different criteria or categories and in ways that digital content has not been searchable before. Digital content can also be imported to the universal digital content system from a local or remote location. Each type of digital content could be organized according to conventional ways of sorting various types of digital content, such as, but not limited to, type of digital content, author, subject, date received or sent, conversation, and the like.

In addition, a global view can be provided that combines all of the digital content to which the universal digital content system has access to be sorted according to various criteria. The digital content can be organized by combining messages from any sender using any messaging method, author, date, type of digital content, conversation, and the like. Conversations relate to two or more digital content files that are electronically linked together using hyperlinking, replying, forwarding, collaborating, and the like, into distinct conversations allowing a user to view the history of a conversation. The user can further view any conversation involving a particular piece of digital content.

Another embodiment relates to providing collaborating features using the dynamic user interface of the present invention. The universal digital content system keeps track of digital content that is linked together and specific places where content from one file might be linked to content in another file. As an example, a user can highlight a section in an email, select to collaborate to the email, and the highlighted section is included in a collaboration message. The collaboration message can be sent by any messaging means. A user can then click on the highlighted section in the collaboration message which will act as a hyperlink to the referenced digital file. This dynamic content linking can be facilitated by the dynamic user interface morphing between the referenced digital content (i.e., email) and the reply digital content (i.e., instant message). The collaboration feature can be extended to multiple referenced files and multiple collaborators.

These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Generally, the present invention relates to a universal digital content system that includes a dynamic user interface for creating, organizing, sending, receiving, accessing, collaborating with and otherwise managing digital content. The universal digital content system of the present invention is similar to the multipurpose text application disclosed in co-pending U.S. patent application Ser. No. 11/005,348, filed Dec. 6, 2004, the disclosure of which is incorporated herein by reference in its entirety. However, the universal digital content system contains additional features in addition to those associated with the multipurpose text application.

As used herein, the term "digital content" refers to an electronic file that contains visual or audio content. Digital content can be text files in various forms such as, but not limited to, word processing files, email messaging files, text messaging files, instant messaging files, and the like. Such text files can also include image content or audio content embedded therein or attached thereto. Digital content can include image files or movie files, and the like. Digital content can also include audio content such as voice messaging files, movie files that contain audio content, music files or other sound files, and the like.

Figure 1A:
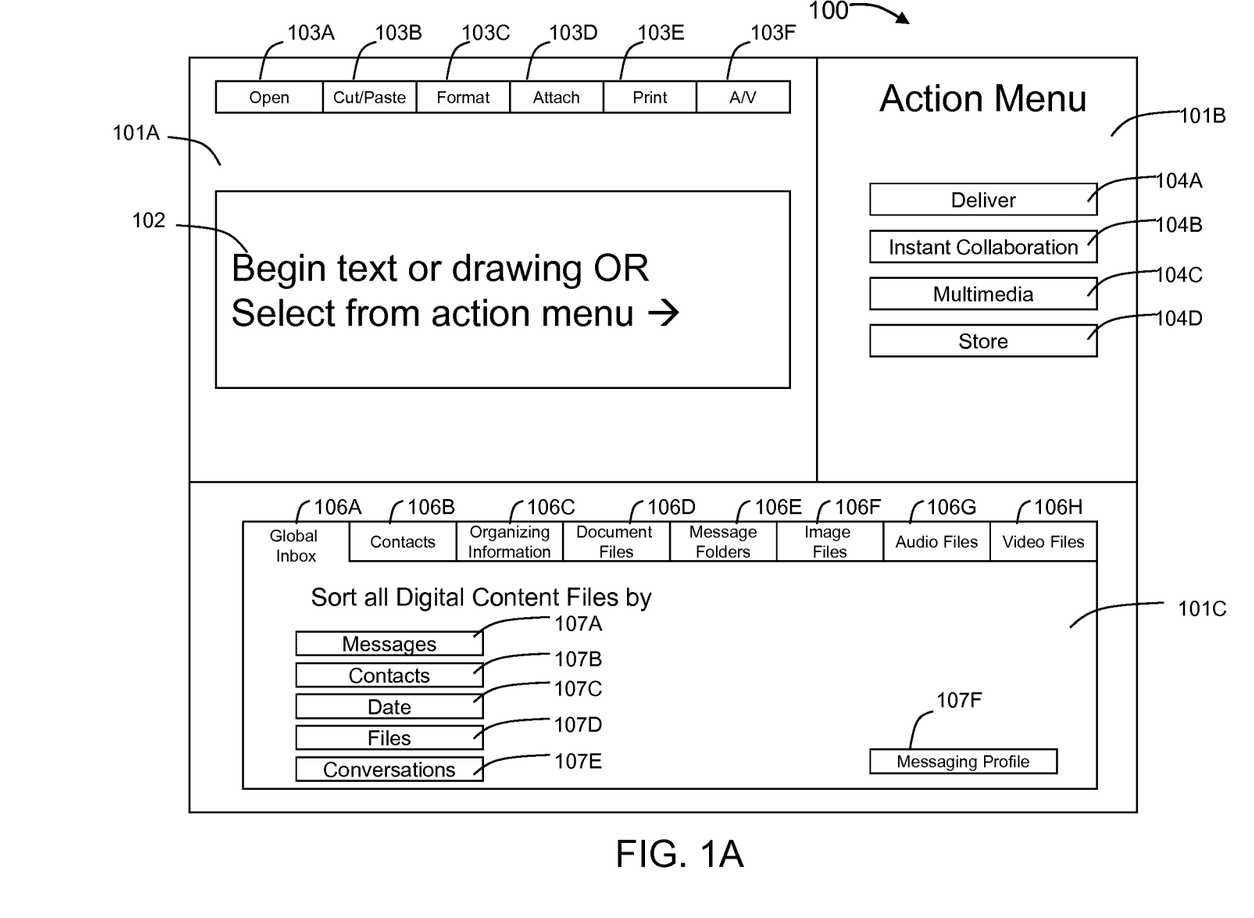
FIG. 1A through 1C illustrate an exemplary dynamic user interface displaying various features according to embodiments of the present invention.

With reference to FIG. 1A, a dynamic user interface 100 associated with a universal digital content system (see FIG. 3) is depicted to illustrate the versatile nature of the universal digital content system. Other components of the universal digital content system in addition to the dynamic user interface will be described with reference to FIG. 3. The dynamic user interface 100 is a generally small, fast user interface which provides various interface areas, referred to generally as a viewing area 101A, action menu area 101B, and organizing area 101C. The interface areas 101A through 101C can operate co-dependently or independently of each other. The division of the dynamic user interface 100 into these general areas is provided only for purposes of describing the present invention. It should be understood that components or functionalities from one interface area 101A through 101C of the dynamic user interface 100 may be duplicated, modified, overlap or be moved into another interface area of the dynamic user interface depending on design considerations. Further, other functionalities for each interface area 101A through 101C in addition to the ones described herein may also be included within the spirit of the teachings of the present invention.

Viewing area 101A includes a generic viewing screen 102 for formatting various types of digital content. In one embodiment, viewing screen 102 appears as a blank template when first opened and allows a user to input any digital content such as text, graphical representations, images, sound, and the like. Thus, the viewing screen 102 may also have maximizing, minimizing and scrolling capabilities if the user wants to change the viewing capabilities of the viewing screen, such as when the user wants to create a lengthy text document. Although not shown, various means for inputting digital content into the viewing screen 102 can be used, such as, but not limited to, a keyboard, a mouse, a stylus or other pointer (where the viewing screen is pressure sensitive), a joystick, audio hardware and software (e.g., microphone), and imaging hardware and software (e.g., camera hardware and/or software), and the like, whether directly or remotely connected.

Figure 1B:
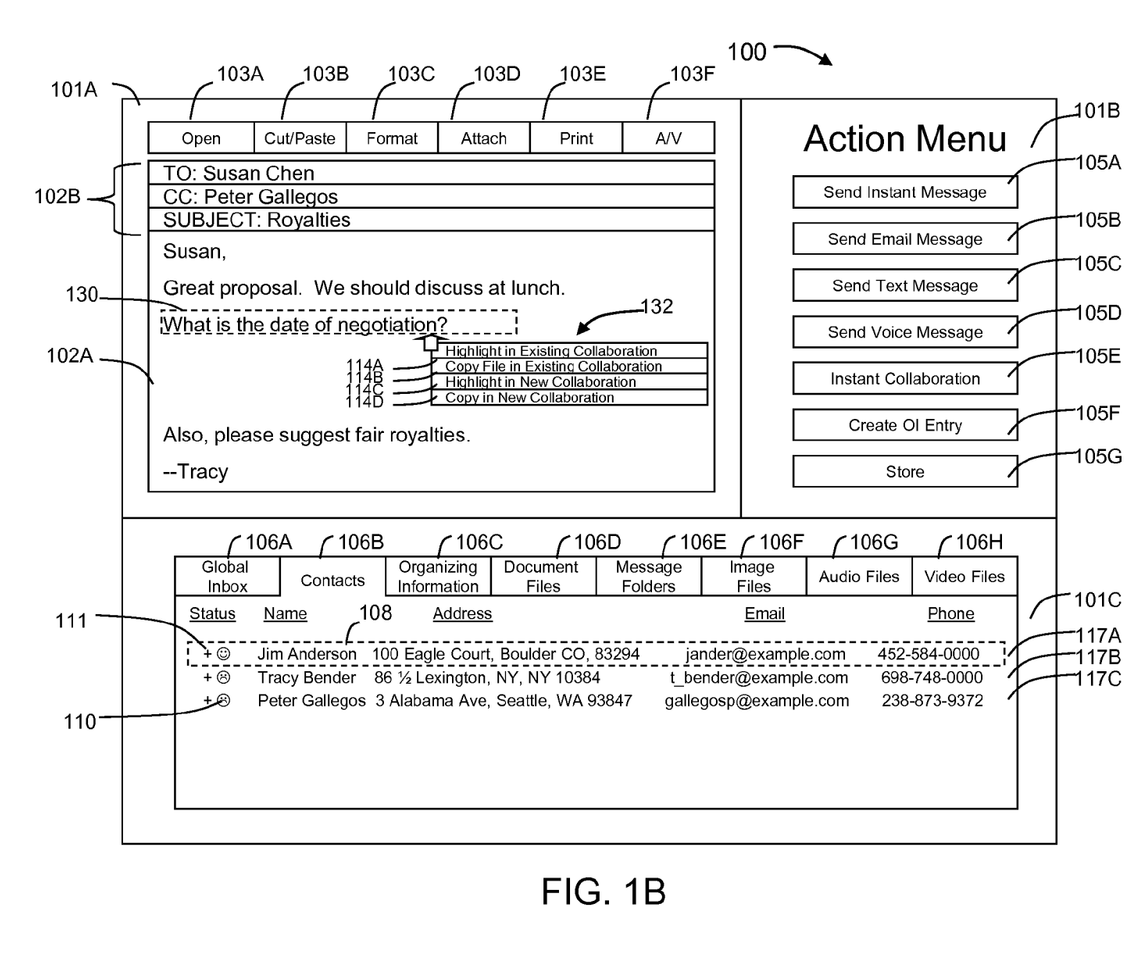

As illustrated in FIG. 1A, viewing screen 102 may also initially display brief instructions to a user to indicate that any of the selections contained in action menu area 101B (discussed below) can be selected even before a digital content file is generated. When a user selects a particular type of digital content to create, the viewing screen 102 will change to be more specific to that particular digital content. FIG. 1B illustrates one embodiment in which the user has input digital content into viewing screen 102 and decides to send the digital content by email messaging. The viewing area 101A changes to include a message viewing screen 102A (which may be original viewing screen 102) and header fields 102B (e.g., TO, CC, BCC, and subject line) for allowing the user to specify or view recipients, addresses, and/or subject lines of an electronic message being generated and/or managed.

Figure 1C:
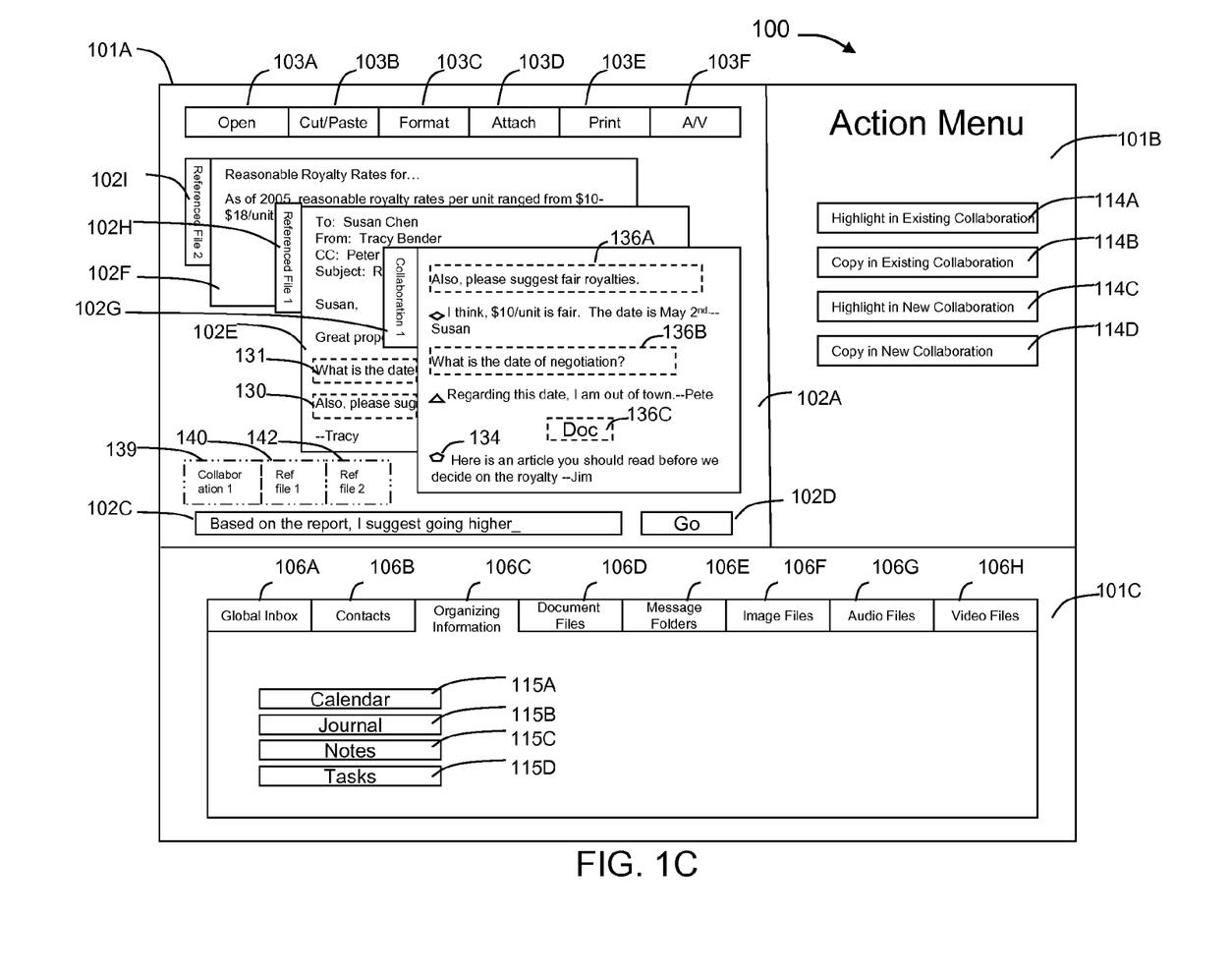

With reference to FIG. 1C, suppose a user decides to send digital content as an instant message. The user selects instant message selection 105A from action menu area 101B. The viewing area 101A changes to provide fields that may be more suitable or conventional for managing instant messages. For examples, as shown in FIG. 1C, viewing area 101A has changed to provide a message viewing screen 102A (which may be original viewing screen 102) and an input screen 102C. Additionally, send selection 102D may be provided to initiate sending the text that is input into screen 102B.

In addition, FIG. 1C illustrates viewing area 101A configured to accommodate viewing multiple digital content. That is, an additional viewing screen 102E and 102F are provided to enable viewing a second and third digital content file. The viewing screen 102A overlaps viewing screens 102E and 102F. Multiple viewing screens can also be accomplished by forming a split view on one main viewing screen. As shown in FIG. 1C, the viewing screen 102A, 102E, 102F can have indicators 102G, 102H, 102I, respectively (e.g., an icon or tab bar) that reflects the order in which the viewing screens were created. This can assist the user in remembering to what digital content each viewing screen relates. Indicators 102G, 102H, 102I can have descriptive text, different colors, icons that reflect what digital content type the viewing screen displays (e.g., collaboration file, referenced file), and the like. Each viewing screen 102A, 102E, 102F may also include minimizing and maximizing features. The ability to allow a user to view multiple digital content files can be beneficial where a user is collaborating on a digital content file, described further below. Thus, application-specific features, such as input screens, header fields, and the like, are generally hidden in the initial presentation of viewing area 101A to avoid the appearance that the dynamic user interface 100 can be used only for certain types of digital content.

Turning back to FIG. 1A, viewing area 101A can also exemplarily include digital content processing selections 103A through 103E that provide at least basic functionalities that can apply to one or more types of digital content such as, but not limited to, opening existing digital content files (selection 103A), cut and pasting digital content (selection 103B), and formatting functions (selection 103C) available in most word processing and/or multimedia applications. The viewing area 101A may also include the ability to attach objects such as text, image, audio, or movie attachments (selection 103D) in any digital format. The viewing area 101A may also include printing capability (selection 103E). Further, the viewing area 101A may include audio/visual tools (selection 103F) for generating and/or playing audio and/or visual content. The dynamic user interface 100 can thus generally be used to create, access, or otherwise manage any digital content. The term "selection" refers to any graphical icon or button or menu item or indicator that can be selected by a user in order to access that functionality.

The selections 103A through 103F may include pull down menus which provide for additional selections that a user can select. Pop-up dialogue windows may appear to allow a user to further navigate through various selections for selections 103A through 103F, such as, but not limited to, searching, browsing, formatting, attaching, printing, and audio/visual selections. Further, viewing screen 102 could also be used to provide dialogue windows for enabling these and other functions.

Turning now to action menu area 101B, a plurality of selections 104A through 104D provides general actions that can be taken related to managing digital content in the viewing area 101A. Operation of action selections 104A through 104D may also require some interaction with viewing area 101A and/or organizing area 101C. Before, during or after the user creates digital content, the user can then select any of the action selections 104A through 104D.

Figure 2A:
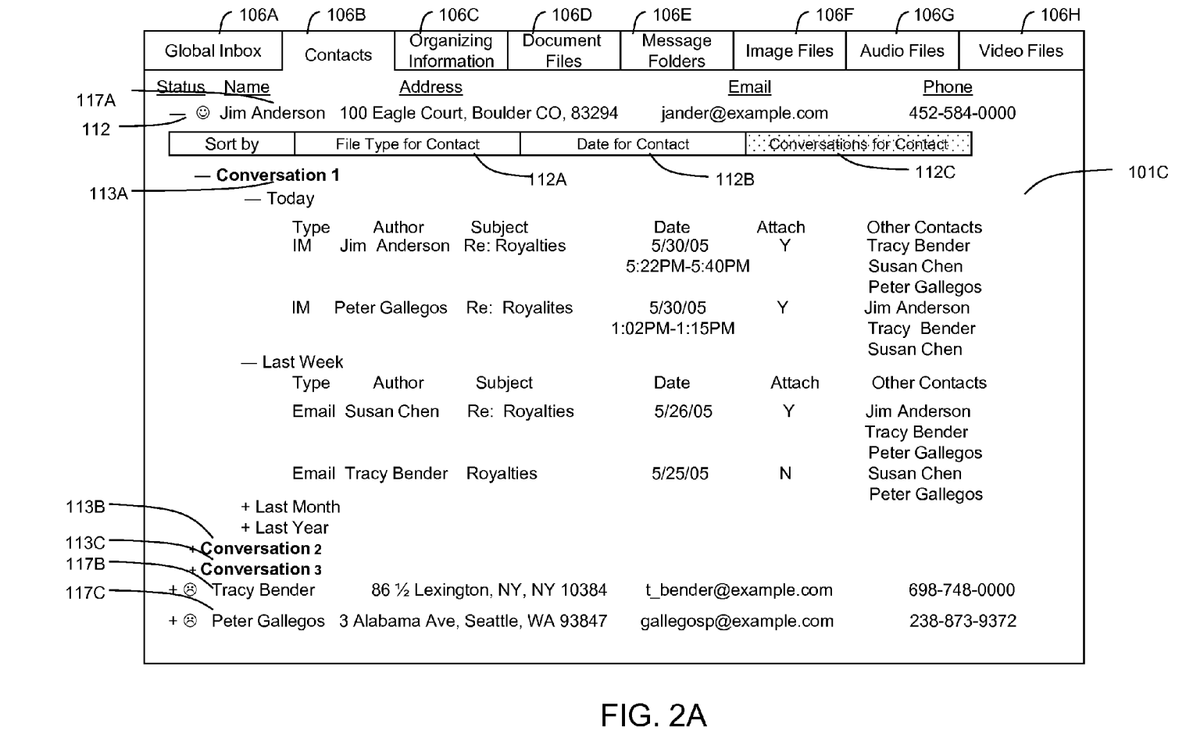
FIGS. 2A through 2B illustrate exemplary ways of organizing digital content on the dynamic user interface.

Exemplarily, as shown in FIG. 2A, deliver selection 104A causes action menu area 101B to change to provide various delivery mechanisms for handling a digital content file created or otherwise accessed by a user. Any number of delivery mechanisms may be associated with deliver selection 104A such as, but not limited to, sending an instant message 105A, sending an email message 105B, sending a text message 105C, sending a voice message 105D, creating an organizational information entry 105E, performing collaboration 105G and saving a draft of the digital content file 105G. Thus, by selecting one or more of these delivery mechanism selections 105A through 105G, the user is able to activate the functions necessary to accomplish the selected action(s). It will be appreciated that other existing or future developed actions for handling digital content may be included in view of the teachings herein.

As used in the present invention, the term "delivery mechanism" and "action" will sometimes be used interchangeably to refer to a potential action to be performed with a digital content file since selection of an action menu selection 104A through 104D changes the dynamic user interface 100 to provide the functions reflected in delivery mechanism selections 105A through 105G. The terms delivery mechanism and action are broad enough to encompass delivering a digital content file to a database on the user's device or in a remote location, such as a remote server. Thus, storing a digital content file in a database can also be considered an action in accordance with the scope of the present invention.

When a delivery mechanism selection 105A through 105G is selected, either before, during or after the digital content file is created or otherwise accessed, the viewing area 101A can be modified as described above to display the information necessary to carry out the selected action. In some cases, for example in the email view (FIG. 1B) and the instant messaging view (FIG. 1C), the user may be required to produce additional information. The multi-purpose and adaptable nature of the dynamic user interface 100 thus provides a user with added freedom in managing various types of digital content such as, but not limited to, managing instant messages, email messages, text messages, voice messages, organizational information, word processing documents, image files, audio files, movie files, and the like, without having to navigate through several different applications. Any of the selections in action menu area 101B can be selected at any time and the dynamic user interface 100 will change corresponding to the user selection. In addition, the user may use the same digital content file for multiple purposes using the same universal digital content system.

Collaboration selection 104B changes the action menu area 101B to provide functionalities related to allowing a user to collaborate on digital content with other users. FIG. 1C illustrates these collaboration selections 114A through 114D. Collaboration is described more fully below, but briefly, FIG. 1C illustrates that some selections for using collaboration can include, but are not limited to, (1) highlight a portion for comment to existing collaboration 114A; (2) insert copy of file into existing collaboration 114B; (3) highlight a portion for comment in new collaboration 114C; or (4) insert copy of file into new collaboration 114D.

Multimedia selection 104C changes the action menu area 101B to include selections relating to creating, playing, or otherwise managing multi media content. Store selection 104D allows a user to save digital content to local or remote storage. Both selections for handling multimedia 104C and storing digital content 104D can include selections that are well known in the art and will not be discussed in greater detail herein. It will be appreciated that the various selections 104A through 104D in action menu area 101B may be modified depending on system design configurations.

Finally, FIG. 1A illustrates organizing area 101C which allows a user to view digital content stored on or otherwise accessed by the universal digital content system in various different screens. These screens include, but are not limited to, a global inbox screen 106A, contact information screen 106B, organizational information screen 106C, documents screen 106D, messaging screen 106E, image files screen 106F, audio files screen 106G, video files screen 106H, and the like.

The global inbox screen 106A is used to combine and organize any digital content that the user can access using the universal digital content system. The global inbox screen 106A contains global selections 107A through 107E indicating broad categories by which digital content can be organized including, but not limited to, messages 107A, contact view 107B, date 107C, type 107D, and conversations 107E. The user can also select a user messaging profile 107F. Generally, selections 107A through 107F apply across all digital content files whereas screens 106B through 106H provide more focused ways of organizing digital content.

With reference to global messaging view 107A, the universal digital content system provides a single interface for accessing messages received from different messaging platforms such as, but not limited to, instant message files, email message files, text message files, and voice message files, and the like. Generally, when a user selects global messaging view 107A, the organizing area 101C changes to display that all of the messaging digital content files may be grouped together and organized under broad date categories, with the most recent messaging data files received being listed first since a user is most likely to view newer messages first.

In another embodiment, the messaging digital content files can be organized into broad messaging categories such as, but not limited to, instant messages, email messages, text messages, voice messages, and the like. This embodiment can be considered a subset of global file view 107D, since messaging digital content files are simply some of the types of digital content that can be accessed by the user. Thus, this embodiment will be described in further detail below with reference to global file view 107D and FIG. 2A. However, an expand selection may be provided in the global messaging view 107A to expand the display to reflect the global file view 107D to show all types of digital content.

When the user selects any of the displayed messages, the dynamic user interface 100 accesses the appropriate functionality in universal digital content system (described below) to allow the user to view the message in viewing area 101A and/or hear the message. This may include interfacing the universal digital content system with audio hardware and/or software to enable a user to listen to voice messages. As discussed above, the viewing area 101A may change to display features specific to the messaging platform (e.g., email, IM, text messaging, voice messaging). Viewing messages also allows a user to view attachment as is conventionally done.

As shown in FIG. 2A, selecting global contact view 107B in global inbox screen 106A causes the digital content stored or otherwise accessed by universal digital content system to be displayed in organizing area 101C based on the broad category of the author of the digital files. The contact information relating to each contact can be minimized using an icon (not shown) so as to simplify the display. The digital content relating to each contact can be sorted by any criteria such as, but not limited to, date, type, conversation, subject, and the like. FIG. 2A will be described in further detail with regard to contact viewing screen 106B.

Global date view 107C allows a user to sort all of their digital content under the broad category of date. This feature is somewhat illustrated in FIGS. 2A and 2B. However, whereas FIG. 2A relates to organizing by contact and conversation FIG. 2B relates to organizing by type, the global date view 107C groups all of the digital content together and organizes it according to a date range.

Figure 2B:
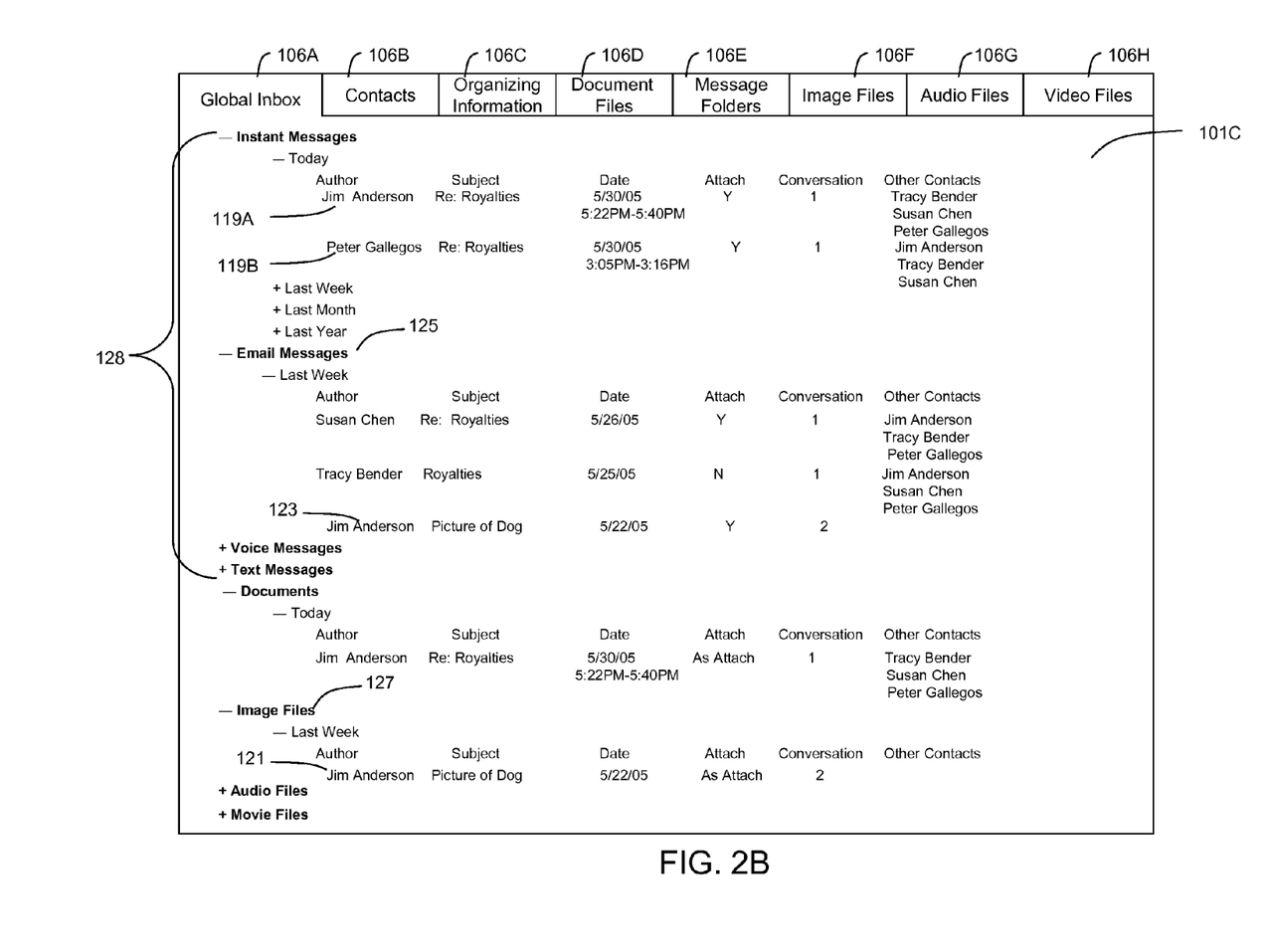

As shown in FIG. 2B, selecting global file view 107D causes the digital content stored by the universal digital content system to be organized and displayed according to the broad category of type of digital content such as, but not limited to, email messaging files, instant messaging files, text messaging files, voice messaging files, documents, image files, audio files, sound files and movie files, and the like.

With regard to instant messages, typically IM messages are not stored during the IM session. However, universal digital content system can log IM sessions and maintain them in storage for inclusion in the organizing functions of the present invention. Further, a user will be able to open and continue an IM session based off of a stored IM session, discussed below. Generally, because IM sessions occur over a span of time, the universal digital content system monitors the date and time at which an IM session begins and ends. Further, the universal digital content system monitors for activity in the IM session and makes note of extended periods of inactivity. In this manner, IM sessions can be divided into one or more session periods, with each period being able to be identified by a date and time range. This is illustrated in FIG. 2B by IM period 119A and IM period 119B being displayed as distinct digital files so that segments that belong together.

In the case where the digital content file was originally included as an attachment or collaboration referenced digital content, it will be displayed both within the message in which it was attached or referenced. In addition, the attachment or collaboration referenced digital content will also be displayed as a primary digital content file under the category type in which it falls. For example, assume an image file 121 is attached to an email message 123. The email message 123 will be listed under the email messages category 125 indicating that the email message contains an attachment. In addition, the image file 121 will be displayed under the image files category 127 indicating that the image file was originally attached in another message. However even though the image file 121 is displayed under the image file category, when a user selects on the image file 121, the universal digital content system may first open the primary email message 123 first, allowing the user access to the image file 121 that is attached. Alternatively, selection of the image file 121 could also directly open the image file for viewing on viewing screen 102. Of course, when the image file 121 is opened, as discussed above, the viewing area 101A may change to display additional features related to viewing and/or managing image content such as, but not limited to, editing, resizing, coloring, drawing tools and the like.

Finally, in FIG. 2B, the digital content types which would most likely be included in one embodiment of the global messaging view 107A are shown by bracket 128. Thus, in one embodiment, global messaging view 107A can display a subset of digital content files that are shown in the global file view 107D.

Selecting global conversation view 107E will organize digital content under the broad category of conversation. As used herein, the term "conversation" is used to refer to digital content that is linked or otherwise connected. For example, digital content in an electronic message are linked and can be components of a conversation. Thus, a conversation may show the primary message in which an attachment is included and also the attachment itself as part of a conversation. A conversation can also include any reply or forwarded messages related to a message. Further, a conversation can include linking created during collaboration or attachments. Collaboration will be described further below. However, generally, users can collaborate on a particular digital content file (the referenced digital content file) and link the referenced file into one or more collaboration messages. The collaboration messages will continue to save the link to the referenced file so the collaboration message and referenced file are identified as part of a conversation. It will be recognized that a conversation can thus be composed of one or more digital content files and one or more contacts.

FIG. 2A somewhat illustrates the global conversation view 107E except that FIG. 2A (which relates to the global contact view 107B) only shows conversations relating to one contact. In order to view all conversations for all contacts, the user would select on global conversation view 107E. FIG. 2A illustrates that contact 117A has been involved in conversations 113A, 113B, 113C. Each conversation 113A, 113B, 113C can be expanded to show the digital content involved in the conversation.

Finally, a messaging profile selection 107F is provided to allow a user to specify when and how to receive messages. Because the user could be inundated with numerous messages at sometimes inconvenient times, a user can specify the method of delivery of messages and times at which certain delivery methods will be available. A user can specify certain time periods during which each type of messaging is available to receive incoming messages. For example, messaging that requires a user to generally be present at all times such as instant messaging can be forwarded to as email messages. In another example, a user may not be available during a meeting to receive voice messages and may rather have voice messages translated to text messages or forwarded as email. In addition, a user could allow incoming messages from certain contacts to be passed through a certain messaging platform (e.g., instant messaging) while notifications of messages from other contacts are withheld until the user accesses a message viewing selection 107A. The universal digital content system would thus include a module which handles the user's messaging profile, discussed below.

Having described the features of global inbox screen 106A, the other screens 106B through 106H will now be briefly described. Turning to FIG. 1B, the contact screen 106B can include contact information for one or more contacts 117A, 117B, 117C. The contact screen 106B can show the name, address, phone numbers, fax numbers, messaging addresses, and the like, for each contact 117A through 117C. Contact information can be used as is conventionally done to locate a contact. An icon 110 or other indication (such as graying or highlighting the area around certain contacts) can be used to indicate the network status of the contacts. Network status can include whether a recipient is online, offline, connected via a wireless or mobile device, idle, online but unavailable (e.g., idle or away), and the like. For example, an icon indicating a face with a smile can be used to indicate that a contact is online while an icon having a face with a frown can mean that the contact is offline. When a contact is offline, a user may be prevented from sending an instant message to the user. In another embodiment, the user's messaging profile may be configured to automatically send messages by email as either an email attachment or as inline text in an email message when a user is prevented from sending an instant message to a contact.

In addition, messaging information stored for each contact can be used to assist in delivering messages to a contact. Exemplarily, when a user decides send a message, the user can select or highlight one of the contacts, as indicated by the dashed line 108 surrounding the contact named Jim Anderson. All necessary address information (e.g., email address, mobile phone number) is automatically provided and no other information need be provided from the user unless the user desires to send the message to more contacts.

In contact screen 106B, an expand indicator (e.g., the + and − signs) next to each contact 117A, 117B, 117C can convert the view of FIG. 1B to show the digital content that each contact 117A, 117B, 117C has authored, with FIG. 2A showing this expanded view. The expanded contact view in FIG. 2A also shows sort options 112A through 112C that allows a user to sort the digital content for each contact by file type, date or conversation. In the embodiment of FIG. 2A, the user has selected to sort the digital contact for contact 117A by conversations 112C.

Organizational information screen 106C is illustrated in FIG. 1C and selection of this screen displays various organizational information selections 115A through 115D that display various types of organizational information. A user can select calendar items 115A, journal items 115B, note items 115C, task items 115D, and the like.

Documents screen 106D displays all of the word processing files and can allow a user to sort these files by date, author, subject, and the like.

Messaging screen 106E provides various ways of viewing messaging digital content. For example, a global messaging view folder may be provided which provides substantially the same view as global messaging view 107A. Messaging screen 106E may further provide sub-folders under the global messaging view folder for each particular digital content type such as, but not limited to, instant messaging folder, email messaging folder, text messaging folder, and voice messaging folder, and the like. Messaging screen 106E may also include other various folders that can be included in messaging such as draft folder, sent folder, delete folder, pending folder for potential spam messages, archive folder, and the like.

Image files screen 106F, audio files screen 106G, and video files screen 106H display all of the image files, audio files, video file, in their respective groups and can allow a user to sort these files by date, author, subject, and the like. Other ways of displaying digital content that a user can access through the universal digital content system may be provided according to the teachings of the present invention and can be viewed, organized, or sorted according to various criteria including the ones discussed herein or those understood by those of skill in the art.

It will be appreciated that while the main organizing views described above attempt to organize the digital content stored or otherwise accessed by universal digital content system to make finding digital content easier for a user, the main organizing views can implementing further organizing or sorting features to assist a user in further organizing or sorting the displayed digital content. For example, as shown in FIG. 2A (the global contact view 107B), the main organizing view is based on contacts, yet the digital content can further be organized according to the file type for each digital content, date of each digital content file, or conversation with which the digital content is associated. In FIG. 2B (the global file view 107D), the main organizing view is based on file type, yet the digital content can further be organized according to date received. Other sorting criteria are also possible such as, but not limited to, author, date created, date received, date sent, subject, title, conversation, existence of attachment, other contacts, and the like.

Now that the details of dynamic user interface 100 have been more fully described, collaboration features will now be described. Collaboration allows one or more collaborators (i.e., contacts, including the user) to collaborate with regard to one or more digital content files. This allows collaborators to comment on one or more referenced digital content files, make edits, and the like. With reference to FIGS. 1B and 1C, the dynamic user interface 100 facilitates collaboration.

A user can select to perform collaboration in a few ways. One way is to select the collaboration selection 104B or 105E in the action menu 101B. Alternatively, formatting selections 103 can be provided with this feature or can be contained in a pull down menu in one of the formatting selections. In yet another embodiment, as shown in FIG. 1B, the user can access a digital file in viewing area 101A or organizing area 101C and right-clicking on their mouse which causes a pop-up menu 132 to appear containing an option for collaboration.

When viewing the digital file in the viewing area 101A, assuming that the user wants to collaborate on the email displayed in FIG. 1B, the user can then highlight a portion of the digital content file (e.g., text, images, sound icon, video or other digital content), as shown by dashed line 130. A user can then select "collaboration" using one of the various ways described above. When viewing the digital file in the organizing area 101C, as shown in FIG. 2B, the user can right click on highlight a digital content file and select "collaboration." using one of the ways described above.

When "collaboration" is selected using one of the ways described above, various selections 114A through 114D are provided as shown in FIG. 1C in the action menu area 101B (and also shown in pop-up menu 132). Selections include (1) highlight a portion for comment to existing collaboration 114A; (2) insert copy of file into existing collaboration 114B; (3) highlight a portion for comment in new collaboration 114C; or (4) insert copy of file into new collaboration 114D. The user can thus select to highlight a portion of the digital content file (selections 114A, 114C) or to have the digital content file included as an attachment (selections 114B, 114D). Further, the user can have more than one collaboration session operating at the same time. Thus, the user can select to include the selected digital content file in an existing collaboration (selections 114A, 114B) or in a new collaboration session (selections 114C, 114D). Similar selections are provided in the pull down menus shown in FIGS. 1B and 2B.

In FIG. 1B, the user has highlighted a portion 130 of the email, hereinafter referred to as the referenced digital content file, to be included in a new collaboration. In FIG. 1C, the dynamic user interface 100 changes to display the highlighted portion 130 in collaboration screen 102A. In addition, FIG. 1C has a viewing screen 102E for displaying the referenced digital content file. The user can comment on the referenced file directly in viewing screen 102E, such as commonly done for email or text messaging. Alternatively, the user can select instant messaging in the delivery mechanism selections 105A through 105G and an input screen 102C can appear to allow a user to input a comment with regard to the referenced file. Thus, a user can select any delivery mechanism for sending the collaboration message to collaborators. Because collaboration implies sending a message to another collaborator to exchange ideas, in one embodiment, selection of one of the "collaboration" selections 114A through 114D (FIG. 1C) in action menu area 101B automatically refreshes to display delivery mechanism selections 105A-105G (FIG. 1B) to enable a user to select any one of the delivery mechanisms.

In one embodiment, the collaboration settings in a user's messaging profile can be configured to always use instant messaging as the preferred mode for collaborating if at least one other collaborator is online. In this mode, the other offline collaborators can view the collaboration thread as email messages when they later access one of the collaboration sessions. This is one example of how the universal digital content system allows seamless transitions from different messaging capabilities. For example, one of the offline collaborators who is not able to participate can come online, access a collaboration message via email and select "collaboration" through one of the various ways discussed above, and continue a collaboration session via instant messaging. In fact, because the universal digital content system combines various messaging applications together and accessible by one dynamic user interface, the delivery mechanisms 105 can be described as various messaging modes. For example, instant messaging can be used to support "urgent" messaging. Email can be used to support "silent" messaging.

FIG. 1C illustrates an embodiment where the collaboration session is occurring via instant messaging. Viewing screen 102A shows a threaded collaboration conversation between multiple collaborators and involving multiple referenced files, the referenced files being shown in viewing screens 102E, 102F. A graphic 134 may be used for each collaborator so that a user can visually see the identity and number of collaborators involved in a collaborating session.

Each viewing screen 102A, 102E, 102F can include an indicator 102G, 102H, 102I, respectively that indicates whether the viewing screen corresponds to a collaboration message or to a referenced digital content file. Instead of showing multiple viewing screens 102A, 102E, 102F for displaying each referenced digital content file, only one viewing screen 102A, 102E or 102F may be displayed at a time and an area may be displayed which shows icons 139, 140, 142 that graphically represent the collaboration file, first referenced file and second referenced file, respectively. The user can select on any of the icons 139, 140, 142 to maximize the viewing screen for that digital content file.

FIG. 1C illustrates that multiple collaborators can make comments on one or more referenced digital content files links 136A, 136B and 136C. The universal digital content system maintains links between the links 136A, 136B and 136C and the respective digital content files to which they correspond. In one embodiment, link 136A refers to highlighted portion 130 in viewing screen 102E, link 136B refers to highlighted portion 131 in viewing screen 102E, and link 136C refers to digital content file shown in viewing screen 102F with no highlighted portion being referenced in this last digital content file. This illustrates that links 136A, 136B and 136C do not necessarily need to be located on the same digital content file or, if they are located in the same digital content file, in any particular order in the digital content file.

When the user selects a link 136A, 136B or 136C, viewing area 101A changes to bring the viewing screen 102E or 102F corresponding to the selected link on top of the other viewing screens. Further, if a link 136 is a highlighted portion of the referenced digital content, the viewing area 101A will locate and display the portion of the referenced digital content that was highlighted. This greatly facilitates the user's collaborating effort.

In one embodiment, referenced digital files are included with each thread of a collaboration session. Thus, if a collaboration message references two different digital content files, both digital content files will be included as attachments to the collaboration message so that other collaborators who might not have the referenced documents can view them. In addition, the collaboration message tracks the location of links 136A, 136B, 136C so that each collaborator has a consistent view of the collaboration conversation. Alternatively, selecting instant collaboration 104B or 105E creates a shared storage area in a server to which all the collaborators have access so that a separate copy of the referenced digital content files do not need to be sent with each thread of the conversation Further, whether the referenced digital content file is included as an attachment or shared link, it will be displayed in organizing viewing area 101C as an attachment to the collaboration message to which it corresponds. The user will then have access to the referenced digital content file by selecting on the attachment to the collaboration message. In addition, for example, in the global file view 107D, the referenced digital content will show up under its appropriate category so that if a user desires to discover which conversations involved a particular referenced digital content, they can locate it using, for example, global file view 102D, which will display an indicator as to what conversation involved this particular referenced digital content. The user can select on the conversation indicator and review the conversation that occurred with regard to this particular referenced digital content as well as any other digital content file that was involved in the conversation.

Further each collaborator will be able to make edits to a referenced digital file. When edits are made to a referenced digital file, the link 136 can display both the previous version and the edited version within the collaboration message. In addition, the edits can be viewed in both the original version and the edited version when the user accesses the referenced digital content file. Finally, an author of a referenced digital file may prevent other collaborators from making edits to the file.

Figure 3:
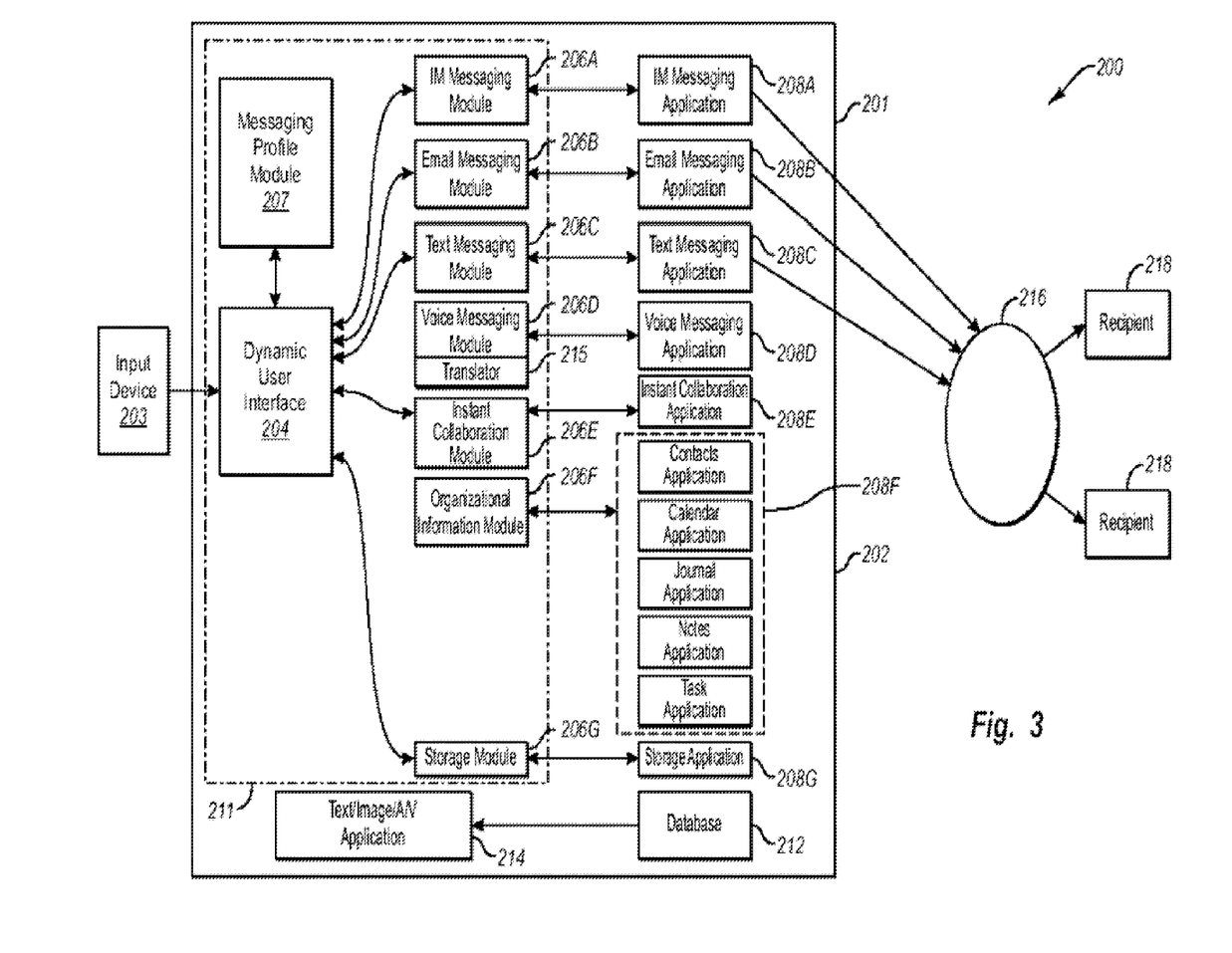
FIG. 3 shows an exemplary network system containing the universal digital content system according to embodiments of the present invention.

Turning now to FIG. 3, an exemplary network configuration 200 provided by way of explanation and not limitation. System 200 includes a user device 201. User device 201 may include, but is not limited to, a personal computer, a handheld computer, a laptop computer, a mobile phone, an organizational information assistant, and the like. Device 201 includes a hardware and software configuration that combine to form universal digital content system indicated by reference numeral 202. A user can input digital content into universal digital content system using any of various input devices 203 including, but not limited to, a keyboard, a mouse, a stylus or other pointer (where the viewing screen is pressure sensitive), a joystick, audio hardware and software (e.g., microphone), and imaging hardware and software (e.g., camera hardware and/or software), and the like, whether directly or remotely connected.

Universal digital content system 202 includes a user interface 204. User interface 204 provides the features described above for the dynamic user interface 100. In this embodiment, the user interface 204 communicates with a plurality of action modules including, but not limited to, a instant messaging module 206A, an email messaging module 206B, an text messaging module 206C, a voice messaging module 206D, an instant collaboration module 206E, an organizational information module 206F, and a storage module 206G. Each of modules 206A through 206G initiates applications 208A through 208G that correspond with each of the action modules 206A through 206G. Exemplarily, applications 208A through 208G include a instant messaging application 208A, an email messaging application 208B, a text messaging application 208C, a voice messaging application 208D, an instant collaboration application 208E, an organizational information application 208F, and a storage application 208G. It will be appreciated that any number of existing or future-developed action modules 206 and corresponding applications 208 may be implemented as necessary in view of the teachings of the present invention. Applications 208A through 208G can be found in the same software application or in different software applications.

The user is thus able to select one or more of the delivery mechanism selections 105A through 105G (FIG. 1B) to initiate action modules 206A through 206G to perform a particular action on the text document created through the user interface 204. The user interface 204 also communicates with at least some of the action modules 206A through 206G to provide information in the organizing area 101C of dynamic user interface 100, such as for contact screen 106B and organizing information screen 106C. Further detail regarding how universal digital content system 202 can perform these acitons exemplified are described in co-pending U.S. patent application Ser. No. 11/005,348, filed Dec. 6, 2004, and entitled "Selection of Delivery Mechanism for Text-based Document, which application is incorporated herein by reference in its entirety. A messaging profile module 207 is provided to allow a user to select and manage restrictions for sending and/or receiving messages through universal digital content system 202.

Voice module 206D includes a translator module 215 for translating audio to text or vice versa for both sending and receiving messages. For example, if a user's messaging profile indicates that the user desires to receive all voice messages in another format (e.g., email, instant message, text message), when an incoming message arrives at user device 201, translator module 215 will convert the audio message to a text format so that the user can access the message under the desired message category using dynamic user interface 100.

It is also possible for the universal digital content system 202 to be bifurcated so that a portion indicated by reference numeral 211 is located on user device 201 while the remaining components of universal digital content system 202 are located elsewhere, e.g., a remote server in network 216 with which the user device 201 communicates. For example, to minimize the footprint of universal digital content system 202 on a user's mobile phone, portion 211 could be located on the user's mobile phone and communicate with a server to provide the additional functionality of the universal digital content system 202.

As shown in FIG. 3, each of action applications 208A through 208G can access a database 212. While the database 212 is shown as a single entity, it will be appreciated that the database 212 may include one or more storage devices, remote or local, to which the user device 201 has access. In addition, it is possible for each action application 208A through 208G to access different databases. However, database 212 is illustrated simply to show that the action applications 208A through 208G are able to access some type of database. The database 212 can store information relating to all digital content files created and/or accessed by universal digital content system 202 so that the digital content files can later be accessed.

In some embodiments, the user interface 204 can access an existing word processing, imaging, and/or audio-visual application 214 residing on the user device 201 or on a server in network 216. This can help to minimize the amount of code required to develop the user interface 204. It will be appreciated, however, that universal digital content system 202 does not have to access an existing word processing, imaging, and/or audio-visual application residing on the user's device, but could have a system-specific word processing, imaging, and/or audio-visual application integrated into universal digital content system 202.

Some of the action applications 208A through 208D allow a user to transmit a message to one or more recipients. Thus, FIG. 3 also illustrates an exemplary network configuration. The user device 201 communicates with a network 216, which can include one or more servers. The network 216 also communicates with one or more recipient devices 218. Similar to the user device, the recipient devices 218 can include, but are not limited to, a personal computer, a hand-held computer, a laptop computer, a mobile phone, an organizational information assistant, and the like.

Thus, the universal digital content system provides several benefits. First, the universal digital content system eliminates the need for a user to navigate through one or more digital content applications in order to find the correct application to manage a digital content file or to perform a delivery function with regard to the digital content file. Second, universal digital content system allows a user to change the action midstream without having to access a different application. Third, the universal digital content system allows a user to perform multiple actions on a particular text document. Fourth, the universal digital content system allows users to control message delivery and notification selections at a single source. Fifth, the universal digital content system provides a common interface for organizing and accessing digital content files stored locally or otherwise accessible by universal digital content system. And finally, the universal digital content system allows collaboration between multiple collaborators and using multiple digital content files.

The embodiments of the present invention may comprise a special purpose or general-purpose computer including various computer hardware. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular actions or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where actions are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a computer configured to display a user interface, the user interface being configured to:
display a first window, wherein the first window is a collaboration window accessible to a plurality of users partaking in a collaboration session;
display an email in a second window, the email including:
a header; and
a body;
display an instant message in a third window;
receive first user input selecting first text of the body of the email displayed in the second window, the first user input being provided by at least one of the plurality of users partaking in the collaboration session;
receive second user input indicating that the selected first text should be added to the first window;
in response to receiving the second user input indicating that the selected first text should be added to the first window:
add, to the first window, a first user-selectable link including the selected first text from the body of the email;
receive third user input selecting second text of the instant message displayed in the third window;
receive fourth user input indicating that the selected second text should be added to the first window;
in response to receiving the fourth user input indicating that the selected second text should be added to the first window:
add to the first window, a second user-selectable link including the selected second text from the instant message;
receive, in the first window, fifth user input selecting the first user-selectable link including the first text from the body of the email, the fifth user input being provided by at least one of the plurality of users partaking in the collaboration session and by a user who is different from the at least one user who provided the first user input; and
in response to receiving the fifth user input that selected the first user-selectable link including the first text from the body of the email:
shift focus in the user interface from the first window to the second window in which the email is displayed; and
within the second window in which the email is displayed, move to the location of the first text within the body of the email, such that the first text of the body of the email may be seen in context with additional adjacent text of the body of the email.

2. The system of claim 1, wherein instant messages used in the collaboration session are viewable as email messages to at least one of the collaboration users.

3. The system of claim 2, wherein the collaboration users who are logged off instant messaging for a certain collaboration session can view the instant messages used in that collaboration session as email messages.

4. A system comprising:
a computer configured to display a user interface, the user interface being configured to:
- display a first window, wherein the first window is a collaboration window accessible to a plurality of users partaking in a collaboration session;
- display an email in a second window, the email including:
  - a header; and
  - a body;
- display an instant message in a third window;
- receive first user input selecting first text of the body of the email displayed in the second window;
- receive second user input indicating that the selected first text should be added to the first window;
- in response to receiving the second user input indicating that the selected first text should be added to the first window:
  - add, to the first window, a first user-selectable link including the selected first text from the body of the email;
- receive third user input selecting second text of the instant message displayed in the third window;
- receive fourth user input indicating that the selected second text should be added to the first window;
- in response to receiving the fourth user input indicating that the selected second text should be added to the first window:
  - add, to the first window, a second user-selectable link including the selected second text from the instant message;
- receive, in the first window, fifth user input selecting the second user-selectable link including the second text from the instant message, the fifth user input being provided by at least one of the plurality of users partaking in the collaboration session; and
- in response to receiving the fifth user input that selected the second user-selectable link including the second text from the instant message:
  - shift focus in the user interface from the first window to the third window in which the instant message is displayed; and
  - within the third window in which the instant message is displayed, move to the location of the second text within the instant message, such that the second text of the instant message may be seen in context with additional adjacent text of the instant message.

5. The system of claim 4, wherein instant messages used in the collaboration session are viewable as email messages to at least one of the collaboration users.

6. The system of claim 5, wherein the collaboration users who are logged off instant messaging for a certain collaboration session can view the instant messages used in that collaboration session as email messages.

7. A non-transitory computer-readable storage medium having stored thereon software executable by a processor to display a user interface, the user interface being configured to:
- display a first window, wherein the first window is a collaboration window accessible to a plurality of users partaking in a collaboration session;
- display a first email in a second window, the first email including:
  - a header; and
  - a body;
- receive first user input selecting first text of the body of the first email displayed in the second window, the first user input being provided by at least one of the plurality of users partaking in the collaboration session;
- receive second user input indicating that the selected first text should be added to the first window;
- in response to receiving the second user input indicating that the selected first text should be added to the first window:
  - add, to the first window, a first user-selectable link including the selected first text from the body of the first email;
- receive, in the first window, third user input selecting the first user-selectable link including the first text from the body of the first email, the third user input being provided by at least one of the plurality of users partaking in the collaboration session and by a user who is different from the at least one user who provided the first user input; and
- in response to receiving the third user input that selected the first user-selectable link including the first text from the body of the first email:
  - shift focus in the user interface from the first window to the second window in which the first email is displayed; and within the second window in which the first email is displayed,
    - move to the location of the first text within the body of the first email, such that the first text of the body of the first email may be seen in context with additional adjacent text of the body of the first email.

8. The computer-readable storage medium as claim 7, wherein the user interface is further configured to:
- display a second email in a third window, the second email including:
  - a header; and
  - a body;
- receive fourth user input selecting second text of the body of the second email displayed in the third window;
- receive fifth user input indicating that the selected second text should be added to the first window; and
- in response to receiving the fifth user input indicating that the selected second text should be added to the first window:
  - add, to the first window, a second user-selectable link including the selected second text from the body of the second email.

9. The computer-readable storage medium as in claim 8, wherein the user interface is further configured to:
- receive, in the first window, sixth user input selecting the second user-selectable link including the second text from the body of the second email, the sixth user input being provided by at least one of the plurality of users partaking in the collaboration session and by a user who is different from the at least one user who provided the first user input; and
- in response to receiving the sixth user input that selected the second user-selectable link including the second text from the body of the second email:
  - shift focus in the user interface from the first window to the second window in which the first email is displayed.

10. The computer-readable storage medium as in claim 8, wherein the user interface is further configured to:
- receive, in the first window, sixth user input selecting the second user-selectable link including the second text from the body of the second email, the sixth user input being provided by at least one of the plurality of users partaking in the collaboration session and by a user who is different from the at least one user who provided the first user input; and in response to receiving the sixth user input that selected the second user-selectable link including the second text from the body of the second email:

shift focus in the user interface from the first window to the second window in which the first email is displayed; and within the third window in which the second email is displayed, move to the location of the second text within the body of the second email, such that the second text of the body of the second email may be seen in context with additional adjacent text of the body of the second email.

11. The computer-readable storage medium of claim 7, wherein the user interface is further configured to display an instant message in a third window.

12. The computer-readable storage medium of claim 11, wherein instant messages used in the collaboration session are viewable as email messages to at least one of the collaboration users.

13. The storage medium of claim 12, wherein the collaboration users who are logged off instant messaging for a certain collaboration session can view the instant messages used in that collaboration session as email messages.

14. A non-transitory computer-readable storage medium having stored thereon software executable by a processor to display a user interface, the user interface being configured to:

display a first window, wherein the first window is a collaboration window accessible to a plurality of users partaking in a collaboration session;

display an instant message in a second window;

receive first user input selecting first text of the instant message displayed in the second window;

receive second user input indicating that the selected first text should be added to the first window;

in response to receiving the second user input indicating that the selected first text should be added to the first window:

add, to the first window, a first user-selectable link including the selected first text from the instant message;

receive, in the first window, third user input selecting the first user-selectable link including the first text from the instant message, the third user input being provided by at least one of the plurality of users partaking in the collaboration session and by a user who is different from the at least one user who provided the first user input; and in response to receiving the third user input that selected the first user-selectable link including the first text from the instant message:

shift focus in the user interface from the first window to the second window in which the instant message is displayed; and within the second window in which the instant message is displayed, move to the location of the first text within the instant message, such that the first text of the instant message may be seen in context with additional adjacent text of the instant message.

* * * * *